US012331825B2

(12) United States Patent
Ljøsne

(10) Patent No.: US 12,331,825 B2
(45) Date of Patent: Jun. 17, 2025

(54) BREATHING MECHANICAL POWER TRANSMISSION AND A PEDALLY PROPELLED VEHICLE WITH SUCH POWER TRANSMISSION

(71) Applicant: MONT INVEST 30 AS, Oslo (NO)

(72) Inventor: Knut Tore Ljøsne, Oslo (NO)

(73) Assignee: MONT INVEST 30 AS, Oslo (NO)

( * ) Notice: Subject to any disclaimer, the term of this patent is extended or adjusted under 35 U.S.C. 154(b) by 0 days.

(21) Appl. No.: 17/781,818

(22) PCT Filed: Dec. 3, 2020

(86) PCT No.: PCT/NO2020/050299
§ 371 (c)(1),
(2) Date: Jun. 2, 2022

(87) PCT Pub. No.: WO2021/112688
PCT Pub. Date: Jun. 10, 2021

(65) Prior Publication Data
US 2024/0376975 A1    Nov. 14, 2024

(30) Foreign Application Priority Data

Dec. 5, 2019  (NO) .................................. 20191440

(51) Int. Cl.
*F16H 57/027*    (2012.01)
*F16H 57/029*    (2012.01)
(Continued)

(52) U.S. Cl.
CPC ......... *F16H 57/027* (2013.01); *F16H 57/029* (2013.01); *F16H 57/0424* (2013.01);
(Continued)

(58) Field of Classification Search
CPC ....... B62M 6/55; B62M 11/14; F16H 57/027; F16H 57/029; F16H 57/0424; F16H 57/0452; F16H 57/0484
See application file for complete search history.

(56) References Cited

U.S. PATENT DOCUMENTS 3,850,448 A * 11/1974 Stewart ................... F16H 39/02
                                                    280/216
4,987,795 A    1/1991 Nguyen

FOREIGN PATENT DOCUMENTS

CN        86209890 U  *  6/1988  ............... B62K 3/00
DE        39 39 050 A1    5/1991
(Continued)

OTHER PUBLICATIONS

Machine translation for IDS cited art JP58-217859 filed Sep. 10, 2024, 1 page.*
(Continued)

*Primary Examiner* — Tisha D Lewis
(74) *Attorney, Agent, or Firm* — Birch, Stewart, Kolasch & Birch, LLP

(57) ABSTRACT

A breathing mechanical power transmission and a pedally propelled vehicle with such power transmission, where the power transmission includes a housing, a first seal, a first axle extending through the first seal and a wall of the housing, wherein the first axle is configured to rotate relative to the housing, and a breather passage configured to release a difference in pressure between the inside and outside of the housing in any three dimensional rotational position of the mechanical power transmission.

18 Claims, 5 Drawing Sheets

(51) Int. Cl.
*F16H 57/04* (2010.01)
*B62M 6/55* (2010.01)
*B62M 11/14* (2006.01)

(52) U.S. Cl.
CPC ..... *F16H 57/0452* (2013.01); *F16H 57/0484* (2013.01); *B62M 6/55* (2013.01); *B62M 11/14* (2013.01)

(56) References Cited

FOREIGN PATENT DOCUMENTS

| | | | | | |
|---|---|---|---|---|---|
| DE | 102011081133 | B3 | * | 11/2012 | ........... F16H 57/027 |
| EP | 0 800 988 | A1 | | 10/1997 | |
| EP | 847915 | A2 | * | 6/1998 | .............. B62M 6/55 |
| JP | 58-217859 | A | | 12/1983 | |
| JP | 2005075322 | A | * | 3/2005 | .............. B62M 7/02 |
| JP | 2012077898 | A | * | 4/2012 | ........... F16H 57/027 |

OTHER PUBLICATIONS

International Search Report, issued in PCT/No. 2020/050299, dated Mar. 4, 2021.
Written Opinion of the International Searching Authority, issued in PCT/NO2020/050299, dated Mar. 4, 2021.

* cited by examiner

B-B

BREATHING MECHANICAL POWER TRANSMISSION AND A PEDALLY PROPELLED VEHICLE WITH SUCH POWER TRANSMISSION

TECHNICAL FIELD

The present invention relates to a breather system for mechanical power transmissions and more specifically mechanical power transmissions that are configured to rotate in different directions during use, such as e.g. bicycle transmissions.

BACKGROUND

As individual mobility is increasing in popularity and demand, new kinds or improvements of well-known transport devices are continuously presented to the marketplace. Such devices could be e.g. manually powered, such as pedally propelled bicycles, scooters etc., or powered devices of the same types, such as pedelecs or electric scooters.

Traditionally, mechanical wear of components of individual mobility devices has been accepted, since maintenance and component costs have been quite low due to the simplicity of the mechanical design.

However, with increased complexity costs associated with repair of damaged or worn components increase.

Some of the wear can be associated with the operating environment, and may vary from one geographical location to another. Another factor is the actual use of the transport device which may differ considerably and lead to large individual differences in wear for device types operating in the same environment.

The degree of wear may also be related to the mechanical construction itself, such as the design, or the materials chosen for the specific implementation.

The different types of wear related parameters above are, in a typical real-life situation, combined into total wear.

Further, as the devices are becoming more and more complex, functional components of the driveline tend to be embedded into containers or housings. There are several reasons for this. First of all, since the devices themselves are becoming more and more complex, it will not be possible to assemble all parts in one assembly line. Secondly, housings are used as a mean to protect the internal components which due to complexity and requirement for low weight may be fragile. Thirdly, containers or housings can be seen as having functional interfaces that can be re-used for several applications or for several devices. Such groups of functional components can be seen as separate sub-systems. Today sub-systems are typically provided by OEM vendors.

Examples of such sub-systems could be e.g. the gearbox, the electric motor, brake systems, or other functional groups or combinations of such functional groups.

When the sub-systems have mechanical interfaces, such as a rotating or moving shaft, a seal is provided between the shaft and the housing to prevent dust, liquids and other substances to enter the housing. Likewise, the seal prevents any fluid in the housing, such as lubrication from leaking.

However, as can be easily observed by monitoring the condition of transport devices with gear boxes, electric motor housings etc. after some time in real-life operation, internal components, such as bearings, are often worn out before their expected lifetime.

For a successful transformation from a polluting transport sector to green mobility, it is important that clean energy personal transport devices, such as manual or electrically assisted bicycles can operate with longer service intervals, and with less wear on the internal components.

SHORT SUMMARY

A goal with the present invention is to overcome the problems of prior art, and to disclose a system and a method that improves the lifetime of the driveline of transport devices.

The invention solves the problems often found in mechanical power transmissions that are subject to varying operating conditions, such as humidity, temperature etc.

Since such devices, e.g. bicycle gears or electric motors are configured for rotation, they are thoroughly sealed to avoid introduction of dirt and dust into the housing and the transmission mechanism. This seems to be the case both for devices with dry and liquid lubrication. If liquid lubrication is used, it is a further motivation for sealing, in order to avoid oil spill.

Seals used in bicycle drives are optimized for low friction and therefore have a lower contact pressure on a dynamic sealing surface than traditional seals for the industry and automotive sector. This may cause small leaks when the pressure difference between an inside and outside of a housing changes, for example, due to atmospheric or temperature changes.

Thus, the seals may not always be able to work as intended. When a large pressure difference between the outside of the housing and the inside of the housing builds up the seal may malfunction and the pressure is aligned through the bearings adjacent to the seals. This has several effects. If a dry lubrication or grease is used, the lubrication starts drying out or cake up. If liquid lubrication is used the seal may start leaking after a while. Further, every time pressure alignment takes place through the seal, the sealing capacity weakens due to microparticles that start cluttering the seal. More and more particles, contamination and moisture will follow into the housing and the components inside will suffer from early wear.

As a result of such unintended leak, the efficiency of the device will be reduced.

The following invention solves these problems for rotatable mechanical power transmissions which require another solution than for non-rotatable power transmissions. The solution takes advantage of modifying components already available as part of such a transmission and it works for both liquid and dry lubricated rotatable power transmissions.

The invention solving the above-mentioned problems is a breathing mechanical power transmission and a pedally propelled vehicle according to the independent claims.

An effect of the invention is that the lifetime of the driveline of transport devices, at least under certain conditions may be improved, and that service intervals may be increased.

An effect of the invention is that the lifetime of the driveline of smaller transport devices that are arranged for rotation in different directions as part of normal operation, such that their drive line rotates, e.g. as part of left and right turns, falling over, or even turning upside down, may be improved.

EMBODIMENTS OF THE INVENTION

In the following description, various examples and embodiments of the invention are set forth in order to provide the skilled person with a more thorough understanding of the invention. The specific details described in the context of the various embodiments and with reference to the attached drawings are not intended to be construed as limitations. Rather, the scope of the invention is defined in the appended claims.

Specific embodiments as illustrated in the figures will be explained below.

Figure 1:
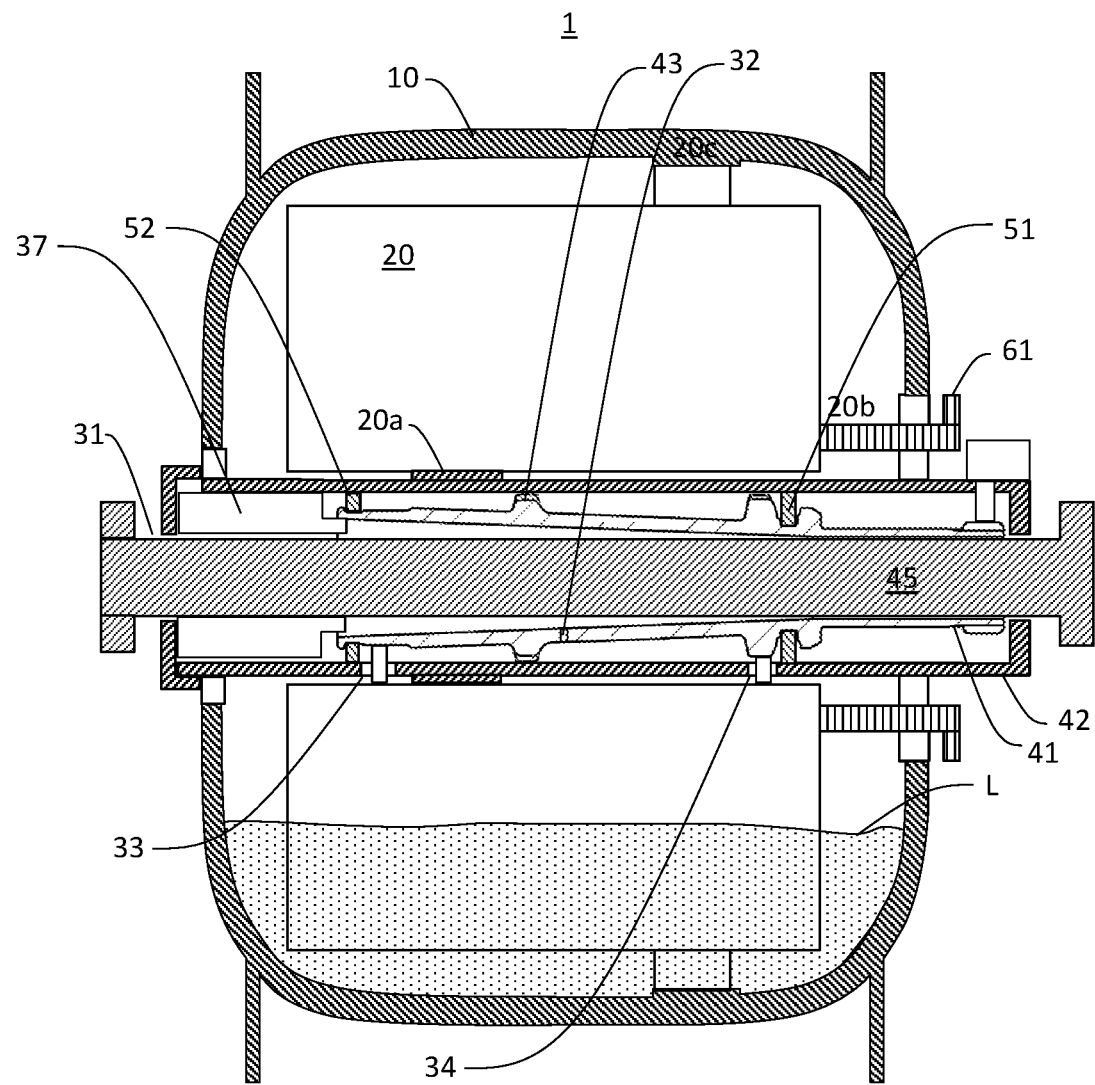
FIG. 1 illustrates a section view of a mechanical power transmission (1) for a wheel hub according to an embodiment of the invention.

FIG. 1 illustrates a section view of a mechanical power transmission (1) for a wheel hub according to an embodiment of the invention. Inside the housing (10) there is an internal gear (20) that may be e.g. of the planetary type. A hollow second axle (42), in this case the main axle (42) extends through the housing. Inside the main axle is the first axle (41), in this case a shift axle, which is also hollow to allow a through-bolt (45) through the hub to fix the main axle (42) to a frame, such as a bicycle frame.

The wheel is driven by a chain wheel or pulley (61) in communication with the crank of the bicycle. A sun wheel (20a) of the internal gear (20) is fixed around the main shaft (42), and a ring gear (20c) driven by planetary gears is fixed to the housing (10). Gears may be shifted by rotating the shift axle (41) with radial shift cams (44a, 44b). The shift cams push shift elements radially through first and second holes (33, 34) in the main axle (42) to change the gear ratio.

The specific operation of the gear is not essential for the invention.

On each side of the first and second holes (33, 34) there are a second and first seals (52, 51), respectively, between the shift axle and the main shaft. The area between the seals can be considered as belonging to the internal of the housing, sealed away from external dust, pollution etc. Similarly, any fluid, such as lubrication between the seals is prevented from leaking out of the housing by the seals.

To allow the shift axis (41) to rotate, its inner diameter is larger than the outer diameter of the through-bolt (45). This gives room for a breather passage (30) between the first end (31) at the end of the main axle (42) and the second end (32), which is the breather hole through the wall of the first axle (42). In both ends there might be dust-caps (37) or similar elements to protect the gear from dirt and dust, but this does not prevent alignment of pressure through the breather passage.

Further, the breather passage (30) is in fluid communication with the rest of the internal of the housing (10), i.e. the space outside the second axle (42), through first and second holes (33, 34). These holes are used to house shift elements arranged between the shift cams of the shift axle and clutches in the internal gear (20) but are in this case also used to allow fluid to pass through.

In this case the first and second holes (33, 34) may be said to have multiple roles. First of all they allow operation of the clutches in the internal gear (20) from the shift axle. Second, they allow lubrication of the shift cams, and third, they are part of a breathing passage between the internal and external of the housing to allow constant pressure alignment to reduce wear on the internal components.

In this embodiment it is assumed that the housing contains liquid lubrication, and the liquid level (L) has been indicated. In this position the mechanical power transmission can breathe as explained above.

Figure 2:
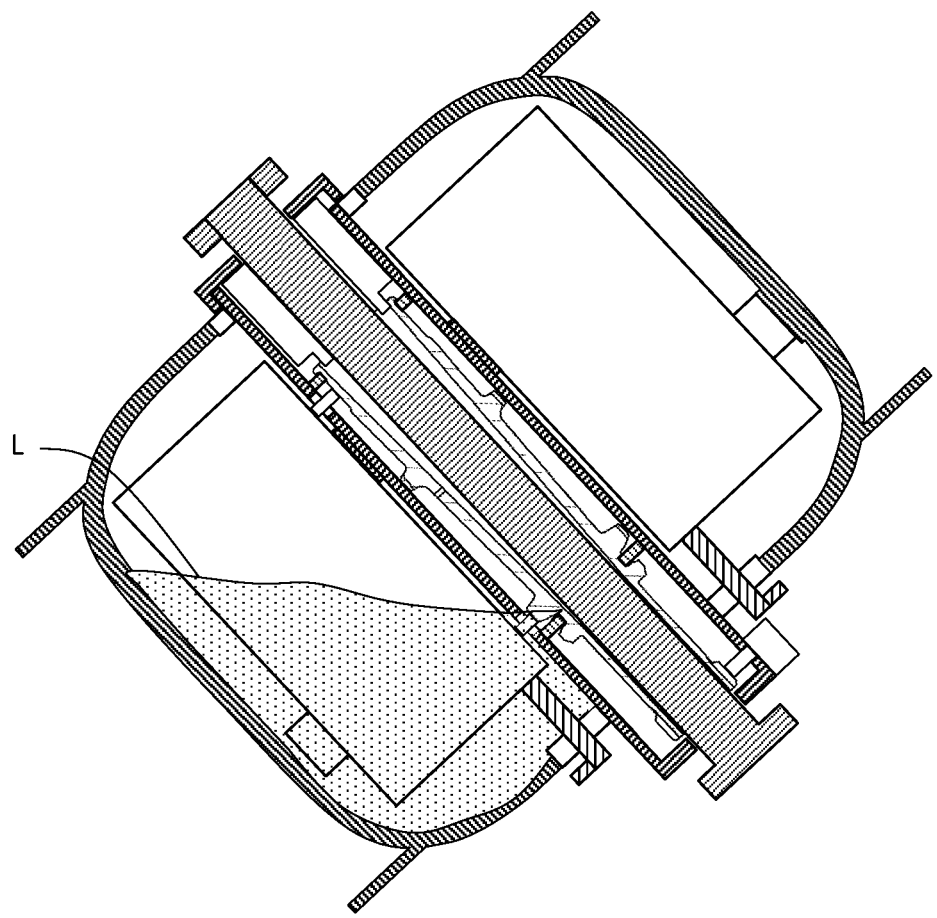
FIG. 2 illustrates the mechanical power transmission (1) of FIG. 1 tilted over to the side.

FIG. 2 illustrates the mechanical power transmission (1) of FIG. 1 tilted over to the side. The liquid level (L) changes relative to the housing, and the main axle may be covered by the liquid. The liquid may enter into the first or second holes (33, 34) interconnecting the annulus between the first and second axles (41, 42) with the gear chamber of the housing (10). However, as long as the second end (32) of the breather passage (30) is arranged substantially in the middle of the housing, the liquid will normally not be able to escape the mechanical power transmission.

It should also be mentioned that liquid that has reached the annulus in this situation will drain into the main housing through the first or second holes (33, 34) as soon as the mechanical power transmission rotates back to the position in FIG. 1.

Further, since the first and second seals (51, 52) are arranged adjacent outside the second and first and holes (34, 33), respectively, liquid will not be accumulated in the annuli of the ends between the first and second axles (41, 42).

Figure 3:
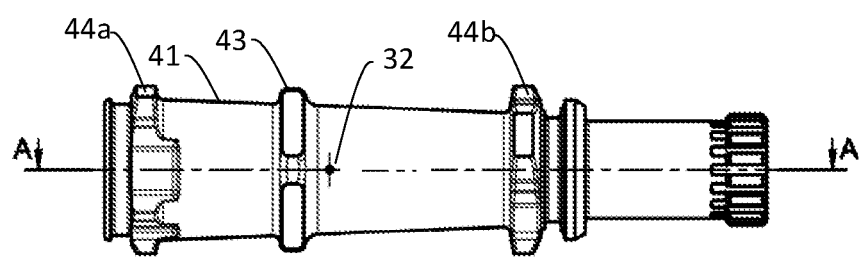
FIG. 3 illustrates in more detail the first axle (41) in the embodiment of FIGS. 1 and 2.

FIG. 3 illustrates in more detail the first axle (41) in the embodiment of FIGS. 1 and 2. It can be noted that the guide cam (43), configured to radially guide the first axle (41) inside the second axle (42), has one or more radial recesses to allow breathing between the second end (32) main hole and the first and second shift cams (44a, 44b) that coincides with the location of the first and second holes (33, 34) of the second axle (42) in the longitudinal direction.

Figure 4A:
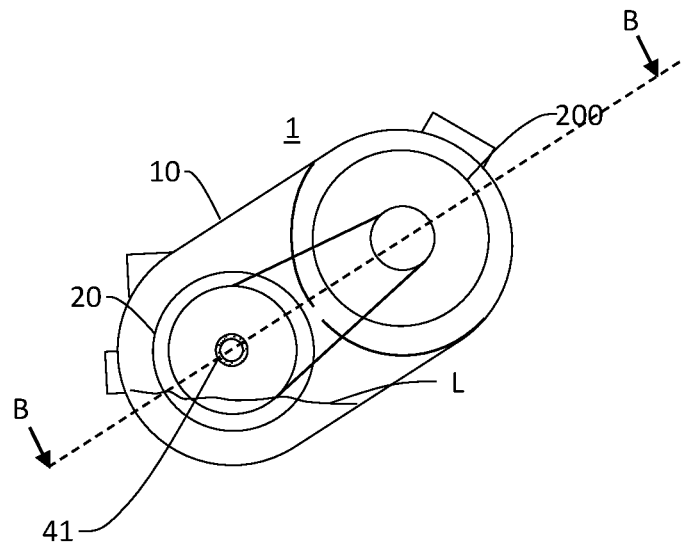
FIGS. 4a, 4b and 4c illustrates another embodiment of the invention where the housing comprises an electric motor (200).
Figure 4B:
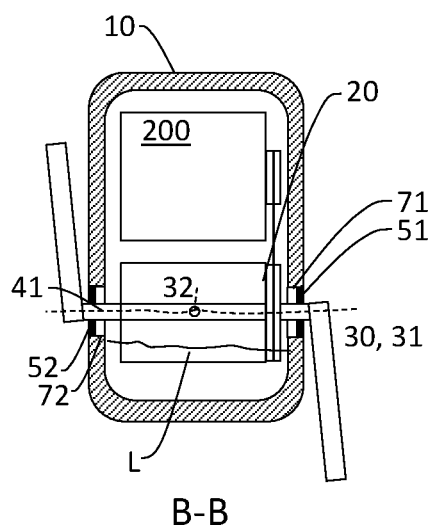
Figure 4C:
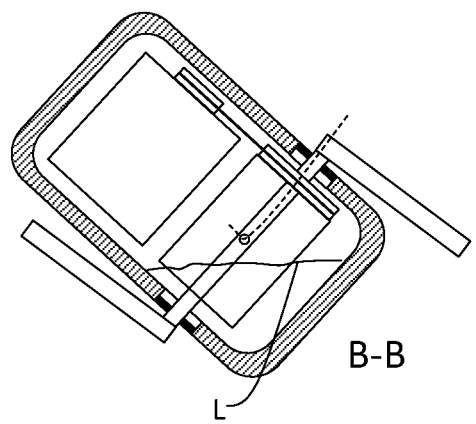

FIGS. 4a, 4b and 4c illustrates another embodiment of the invention where the housing comprises an electric motor (200). This could e.g. be a crank motor of an electric bike. The stapled lines illustrate how the internal of the housing is breathing through the first axle (41).

The first axle (41) is here a hollow crank shaft. The first axle (41) may be driven by an electric motor (200), by e.g. a belt passing over pulleys at each end either directly or via an internal fixed or shiftable gear system (20). The gear could in an embodiment instead have been arranged coaxial with the electric motor.

In this embodiment the housing contains liquid lubrication as illustrated with a liquid level (L).

FIG. 4a illustrates schematically the main components of the housing from the side when the bike is in a normal upright position.

FIGS. 4b and 4c illustrate schematically the same components as in FIG. 4a from above as indicated. Pedal arms on each side of the mechanical power transmission have been indicated. The first axle (41) is supported by bearings (71, 72) arranged in the wall of the housing, and first and second seals (51, 52) seals the housing from the external ambient and vice-versa.

In FIG. 4b the mechanical power transmission is rotated backwards with regard to FIG. 4a, and in FIG. 4c it is further rotated or tilted sideways. The rotation and tiliting results in changes in the liquid level (L) with regards to the internal components of the mechanical power transmission. As long as the second end (32) of the breather passage (30) is arranged substantially in the middle of the housing, the liquid will normally not be able to escape the mechanical power transmission through the breathing channel, even in the case the housing is turned upside down.

Figure 5:
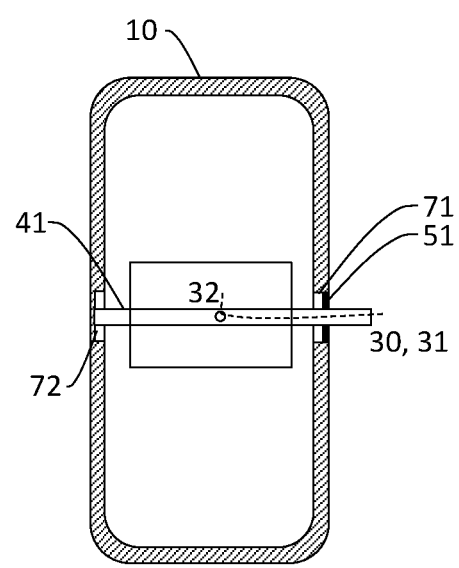
FIG. 5 illustrates schematically in an embodiment of the invention a breathing mechanical power transmission (1).

FIG. 5 illustrates schematically an embodiment of the invention with a breathing mechanical power transmission (1). It comprises a housing (10), a first seal (51), a first axle (41) extending through the first seal (51) and a wall of the housing (10), wherein the first axle (41) is configured to rotate relative to the housing (10). The first axle is supported by rotational bearings (71, 72) in the wall of the housing (10), and in this case only one end of the first axle extends from the housing. The extending end is sealed with the first seal (51). A breather passage (30) configured to release a difference in pressure between the inside and outside of the housing (10) in any three-dimensional rotational position of the mechanical power transmission (1) extends through the hollow first axle (41). The breather passage (30) has a first end (31) and a second end (32), wherein the first end (31) is external to the housing and the second (32) end is internal to the housing.

The rectangle inside the housing (10) may represent any mechanical transmission component or components in contact with the first axle (41). The first axle may be rotationally fixed or integrated with a gear, a pulley, clutches etc., that are further in mechanical contact with other components, such as a mechanical speed reducer, an electric motor etc.

In an embodiment both ends of the first axle (41) may extend through the housing wall. In that case an additional sealing may be used.

In a related embodiment the first axle (41) is split inside the housing (10) to allow the left and right part to rotate independently or with different speeds, such as e.g. in a differential.

Figure 6:
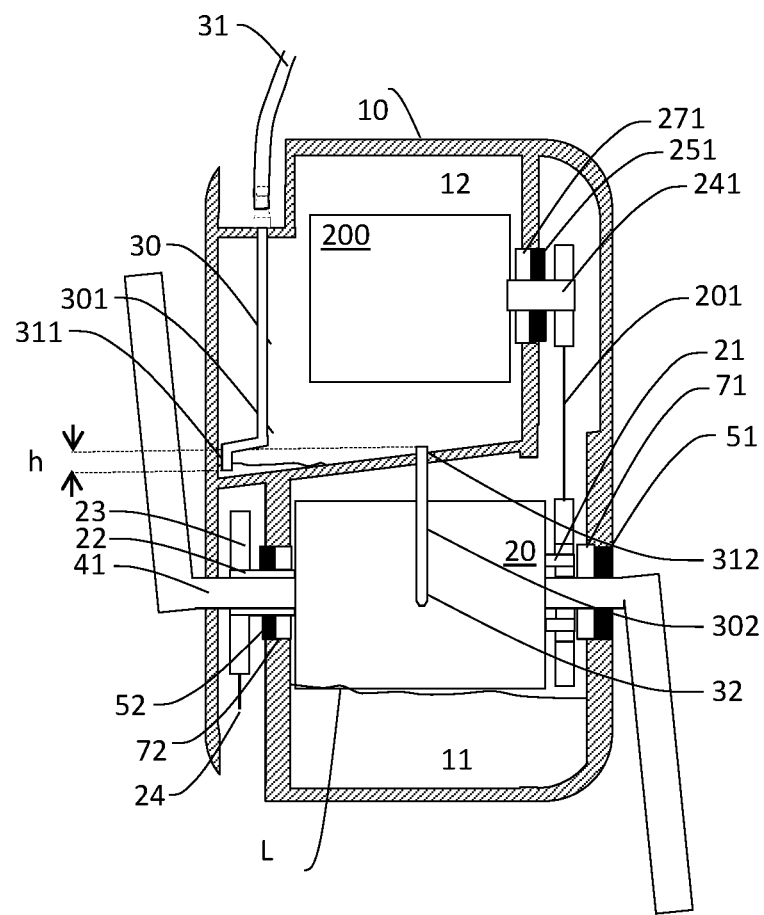
FIG. 6 illustrates schematically an embodiment of the invention.

FIG. 6 illustrates schematically an embodiment of the breathing mechanical power transmission in a drive system for a pedally propelled vehicle, such as a bicycle, comprising an electric motor (200) and a multi-speed gear (20). It comprises a housing (10), divided into first and a second chambers (11, 12), wherein the first chamber (11) is configured to be partly filled with lubrication, and the second chamber (12) is configured to be dry. It further comprises a first axle (41) configured for rotating relative to the housing and extending through the first chamber (11) supported by first and second rotational bearings (71, 72) in opposing walls of the first chamber. First and second seals (51, 52) outside each of the first and second bearings prevent lubrication from escaping the first chamber. In this case the first axle is a crank axle with pedal arms.

The multi-speed gear has a varying gear ratio between an input axle (21) and an output axle (22). Further seals and bearings may be provided between the axles and the one-way clutches as appropriate. A main chain wheel (23) is arranged on the output axle and configured to drive a wheel of the vehicle via a chain (24).

The electric motor (200) is arranged in the second, dry chamber (12), but the motor axle (241) extends into the first chamber and is supported by a motor axle rotational bearing (271) in the intermediate wall. Further, a motor axle seal (251) is arranged adjacent the bearing.

A motor transmission (201) comprising a chain wheel on the motor axle, a chain wheel coaxially arranged on the first axle and a connecting chain allows the input axle of the multi-speed gear to be driven by the motor.

The input axle (21) may also be driven by the first axle (41), i.e. the crank axle. One way clutches may be used between the motor drive and the input axle and between the crank axle and the input axle to prevent the motor drive to drive the crank axle and the crank axle to drive the electric motor.

As previously described, the breather passage (30) has a first end (31) and a second end (32), wherein the first end (31) is external to the housing and the second (32) end is internal to the housing, and wherein the second end is configured to stay above the liquid lubricant in any three dimensional rotational position of the mechanical power transmission in the first chamber.

In this embodiment the second chamber forms part of the breather passage, i.e. the breather passage comprises a first fluid connection (301) between the first end (31) and the second chamber and a second fluid connection (302) between the second chamber and the second end (32). Further the breather passage comprises the second chamber itself.

In a normal driving position of the vehicle the second end is lower than the first end and the first chamber lower than the second chamber. Thus, in this position the second fluid connection (302) has an upper end (312), opposite the second end (32) that terminates inside the second chamber (12). The first connection (301) has a lower end (311), opposite the first end (31) also terminating in the second chamber (12). In the normal driving position, the lower end (311) is lower than the upper end (312) as indicated by the vertical distance h in the drawing.

As explained previously, the breathing passage allows pressure alignment between the interior of the power transmission and the surroundings to avoid leakage through seals. This results in lower lifetime and/or increased need for maintenance. When the temperature gradient is low, i.e. slow changes in temperature inside the housing (10), the temperature difference between the components remain low and pressure difference remains low. The electric motor will gradually heat up and the heat will be distributed through the housing wall or through other components in the system. When the temperature changes, pressure will change inside the first and second chambers and the power transmission will breathe through the first and second connections. E.g. any pressure difference between the first and second chambers (11, 12) will be aligned through the second fluid connection (302) and any pressure difference between the exterior and the second chamber will be aligned through the first fluid connection (301).

Should the temperature drop instantly, such as e.g. when driving through a river, there will be a resulting drop in pressure. In the event that the first end 31 is below water when this pressure drop occurs, some water from outside may be sucked into the second chamber, as illustrated by the waved line. However, the water will not enter into the first chamber, since the first and second connections are separated, and the upper end stays above the water level and water penetration will stop when the pressure difference is aligned.

The next time the vehicle is operated, immediately after introduction of the water in the second chamber or after a break, the second chamber will heat up due to the heat from the electric motor. When this occurs, the pressure increases in both chambers and the water will be blown out through the first fluid connection, from the lower end in the water to the first end, outside the power transmission.

In order to reduce the direct exposure to external fluid, such as rain, splashing etc. the first end is arranged inside the frame of the vehicle. This could be implemented as a tube extending up through one of the frame elements, such as e.g.

inside the seat tube of a bicycle frame. FIG. 6 illustrates the first end (31) to be a tube extending outside the housing (10).

Further embodiments of the invention will be given below. These are numbered. In addition, dependent embodiments defined in relation to the numbered embodiments are described. Unless otherwise specified, any embodiment that can be combined with one or more numbered embodiments may also be combined directly with any of the dependent embodiments of the numbered embodiment(s) referred to.

In a first device embodiment the invention is a breathing mechanical power transmission (1) comprising;
- a housing (10),
- a first seal (51),
- a first axle (41) extending through the first seal (51) and a wall of the housing (10), wherein the first axle (41) is configured to rotate relative to the housing (10),
- a breather passage (30) configured to release a difference in pressure between the inside and outside of the housing (10) in any three dimensional rotational position of the mechanical power transmission (1).

In a second device embodiment that may be combined with the first device embodiment, the invention wherein the housing (10) is configured to be partly filled with a liquid lubricant, wherein the breather passage (30) has a first end (31) and a second end (32), wherein the first end (31) is external to the housing and the second (32) end is internal to the housing, and wherein the second end is configured to stay above the liquid lubricant in any three dimensional rotational position of the mechanical power transmission.

In a third device embodiment that may be combined with the first or second device embodiment, the first axle (41) is hollow, and wherein at least parts of the first axle (41) constitutes at least a part of the breather passage.

In a first dependent embodiment, the second end (32) is a breathing hole in the wall of the first axle (41).

In a second dependent embodiment, that may be combined with the first dependent embodiment, the breathing hole, i.e. the second end is arranged halfway between inner walls of the housing.

In a fourth device embodiment that may be combined with any of the first to third embodiments, comprising a hollow second axle (42) arranged coaxially outside the first axle (41) and configured to rotate relative to the first axle (41) wherein the second axle (42) comprises a first hole (33), wherein a fluid passage is maintained between the second end (32) and the first holes independent of the rotational position between the first and second axles (41, 42).

In a first related embodiment the outer diameter of the first axle (41) in the cross section of the breathing hole (32) is smaller than the inner diameter of the second axle (42) in the cross section of the first hole (33).

In a second related embodiment that may be combined with the first related embodiment, the first axle (41) comprises a guide cam (43) configured to radially guide the first axle (41) with regard to the interior of the second axle (42), wherein the guide cam (43) is arranged between the main and first holes and further configured to allow fluid passage between the main and first holes.

In a fifth device embodiment that may be combined with the fourth device embodiment and any of its dependent embodiments, the second axle (42) comprises a second hole (34), wherein the first and second holes (33, 34) are arranged on opposite sides of the second end (32), i.e. the breathing hole of the first axle (41).

In a related embodiment, the breathing mechanical power transmission comprises a second seal (52), wherein the first and second seals (51, 52) are arranged between the first and second axles (41, 42) outside the second and first holes (34, 33), respectively.

The breathing mechanical power transmission (1) may comprise a protection element (37), such as a dust cap, configured to protect the breather passage (30) from introduction of external liquid or particles into the breather passage;

In a sixth device embodiment that may be combined with any of the second to the fifth device embodiments above, the housing (10) comprises first and second chambers (11, 12), wherein the breather passage (30) comprises a second fluid connection (302) comprising the second end (32) and an upper end (312), opposite the second end, wherein the second end is arranged in the first chamber (11) and the upper end is arranged in the second chamber (12).

In a first dependent embodiment the breather passage comprises a first fluid connection (301) comprising the first end (31).

In a second dependent embodiment, that may be combined with the first dependent embodiment, the first fluid connection comprises a lower end (311), opposite the first end, wherein the first end is arranged outside the housing and the lower end (311) is arranged in the second chamber (12).

In a third dependent embodiment, that may be combined with the second dependent embodiment, the upper end (312) is arranged above the lower end (311) when the power transmission is arranged in a normal operating position.

In a fourth dependent embodiment, that may be combined with any of the second or third dependent embodiments, the second chamber comprises a fluid sump, wherein the lower end (311) is arranged in the sump. By the term "sump" it is here referred to a defined space arranged to hold an amount of fluid. The upper end (312) is arranged above the sump.

The upper end may here be arranged outside and/or above the sump. The main purpose of the sump is that any fluid allowed into the second chamber will remain in the sump until a higher pressure inside the housing forces the fluid out through the first fluid connection.

In a fifth dependent embodiment, that may be combined with the sixth embodiment, or any of the dependent embodiments, the second chamber comprises a heat source.

The heat source is in an embodiment an electric motor (200).

In a sixth dependent embodiment, that may be combined with any of the dependent embodiments, the first fluid connection comprises a tube or pipe extending above the mechanical power transmission.

In a first system embodiment the invention is a pedally propelled vehicle comprising a breathing mechanical power transmission according to any of the device embodiments above.

In a first related embodiment the first axle (41) is a shift axle.

In a second related embodiment the first axle (41) is a crank shaft.

In a second system embodiment that may be combined with the first system embodiment, the pedally propelled vehicle comprises an electric engine (200).

In a first related embodiment the electric engine is arranged to drive the first axle (41).

In a second related embodiment the electric engine is arranged to drive the second axle (42).

In a third system embodiment, that may be combined with the sixth dependent embodiment of the sixth device embodiment, the tube or pipe extends into the seat tube of the pedally propelled vehicle.

In a third system embodiment that may be combined with the second system embodiment, the electric engine (200) is arranged in the housing (10) above a liquid level (L) of the liquid lubricant when the pedally propelled vehicle is arranged in a normal upright driving position.

In the exemplary embodiments, various features and details are shown in combination. The fact that several features are described with respect to a particular example should not be construed as implying that those features by necessity have to be included together in all embodiments of the invention. Conversely, features that are described with reference to different embodiments should not be construed as mutually exclusive. As those with skill in the art will readily understand, embodiments that incorporate any subset of features described herein and that are not expressly interdependent have been contemplated by the inventor and are part of the intended disclosure. However, explicit description of all such embodiments would not contribute to the understanding of the principles of the invention, and consequently some permutations of features have been omitted for the sake of simplicity or brevity.

The invention claimed is:

1. A breathing mechanical power transmission comprising:
   a housing;
   a first seal;
   a first axle extending through the first seal and a wall of the housing, wherein the first axle is configured to rotate relative to the housing; and
   a breather passage configured to release a difference in pressure between an inside and an outside of the housing in any position of the mechanical power transmission,
   wherein the housing is configured to be partly filled with a liquid lubricant, wherein the breather passage has a first end and a second end, wherein the first end is external to the housing and the second end is internal to the housing, and wherein the second end is configured to stay above the liquid lubricant in any position of the mechanical power transmission, and
   wherein the housing comprises first and second chambers, wherein the breather passage comprises a second fluid connection comprising the second end and an upper end, opposite the second end, and wherein the second end is arranged in the first chamber and the upper end is arranged in the second chamber.

2. The breathing mechanical power transmission of claim 1, wherein the first axle is hollow, and wherein at least parts of the first axle constitute at least a part of the breather passage.

3. The breathing mechanical power transmission of claim 2, wherein a second end of the breather passage is a breathing hole in a wall of the first axle.

4. The breathing mechanical power transmission of claim 3, wherein the breathing hole is arranged halfway between inner walls of the housing.

5. A breathing mechanical power transmission comprising:
   a housing;
   a first seal;
   a first axle extending through the first seal and a wall of the housing, wherein the first axle is configured to rotate relative to the housing;
   a breather passage configured to release a difference in pressure between an inside and an outside of the housing in any position of the mechanical power transmission; and
   a hollow second axle arranged coaxially outside the first axle and configured to rotate relative to the first axle,
   wherein the first axle is hollow, and wherein at least parts of the first axle constitute at least a part of the breather passage,
   wherein a second end of the breather passage is a breathing hole in a wall of the first axle,
   wherein the second axle comprises a first hole, and
   wherein a fluid passage is maintained between the breathing hole in the first axle and the first hole, independent of the rotational position between the first and second axles.

6. The breathing mechanical power transmission of claim 5, wherein the first axle comprises a guide cam configured to radially guide the first axle with regard to an interior of the second axle, and wherein the guide cam is arranged between a main and first holes and further configured to allow fluid passage between the main and first holes.

7. The breathing mechanical power transmission of claim 5, wherein the second axle comprises a second hole, and wherein the first and second holes are arranged on opposite sides of the breathing hole of the first axle.

8. The breathing mechanical power transmission of claim 7, further comprising a second seal, wherein the first and second seals are arranged between the first and second axles outside the second and first holes, respectively.

9. The breathing mechanical power transmission of claim 1, wherein the breather passage comprises a first fluid connection comprising the first end.

10. The breathing mechanical power transmission of claim 9, wherein the first fluid connection comprises a lower end, opposite the first end, wherein the first end is arranged outside the housing and the lower end is arranged in the second chamber.

11. The breathing mechanical power transmission of claim 10, wherein the upper end is arranged above the lower end when the power transmission is arranged in a normal operating position.

12. The breathing mechanical power transmission of claim 10, wherein the second chamber comprises a fluid sump, and wherein the lower end is arranged in the sump.

13. The breathing mechanical power transmission of claim 10, wherein the second chamber comprises an electric motor.

14. The breathing mechanical power transmission of claim 1, wherein the breather passage comprises a first fluid connection comprising the first end, and
   wherein the first fluid connection comprises a tube or pipe extending above the mechanical power transmission.

15. A pedally propelled vehicle comprising the breathing mechanical power transmission according to claim 1.

16. The breathing mechanical power transmission of claim 1, wherein the first axle is hollow, and wherein at least parts of the first axle constitute at least a part of the breather passage.

17. A breathing mechanical power transmission comprising:
   a housing;
   a first seal;
   a first axle extending through the first seal and a wall of the housing, wherein the first axle is configured to rotate relative to the housing;

a breather passage configured to release a difference in pressure between an inside and an outside of the housing in any position of the mechanical power transmission; and a hollow second axle arranged coaxially outside the first axle and configured to rotate relative to the first axle, wherein the first axle is hollow, and wherein at least parts of the first axle constitute at least a part of the breather passage, wherein a second end of the breather passage is a breathing hole in a wall of the first axle, wherein the breathing hole is arranged halfway between inner walls of the housing, wherein the second axle comprises a first hole, and wherein a fluid passage is maintained between the breathing hole in the first axle and the first hole, independent of the rotational position between the first and second axles.

18. The breathing mechanical power transmission of claim 6, wherein the second axle comprises a second hole, and wherein the first and second holes are arranged on opposite sides of the breathing hole of the first axle.

* * * * *